(12) United States Patent
Vazquez

(10) Patent No.: US 12,545,169 B2
(45) Date of Patent: Feb. 10, 2026

(54) MOBILE WORK STATION FOR ROBOTIC ARM

(71) Applicant: Deere & Company, Moline, IL (US)

(72) Inventor: Jose Israel Vazquez, San Nicolás de los Garza (MX)

(73) Assignee: Deere & Company, Moline, IL (US)

( * ) Notice: Subject to any disclaimer, the term of this patent is extended or adjusted under 35 U.S.C. 154(b) by 1233 days.

(21) Appl. No.: 17/204,388

(22) Filed: Mar. 17, 2021

(65) Prior Publication Data

US 2021/0323459 A1 Oct. 21, 2021

Related U.S. Application Data

(60) Provisional application No. 63/010,795, filed on Apr. 16, 2020.

(51) Int. Cl.
*B60P 1/50* (2006.01)
*B08B 3/02* (2006.01)
*B25J 15/00* (2006.01)
*B25J 19/00* (2006.01)

(52) U.S. Cl.
CPC ............ *B60P 1/50* (2013.01); *B08B 3/02* (2013.01); *B25J 15/0052* (2013.01); *B25J 19/0025* (2013.01)

(58) Field of Classification Search
CPC .... B25J 19/0025; B25J 15/0052; B25J 9/162; B08B 3/02; B60P 1/50; G05B 2219/40298; G05B 2219/40155; G05B 2219/39001; G05B 2219/39172; A01D 46/30
See application file for complete search history.

(56) References Cited

U.S. PATENT DOCUMENTS

| | | | |
|---|---|---|---|
| 4,621,562 A * | 11/1986 | Carr | B25J 9/046 180/22 |
| 4,840,574 A | 6/1989 | Mills | |
| 5,413,454 A * | 5/1995 | Movsesian | B25J 9/046 414/722 |
| 6,325,749 B1 | 12/2001 | Inokuchi et al. | |
| 8,381,501 B2 | 2/2013 | Koselka et al. | |
| 8,615,907 B2 | 12/2013 | Miller et al. | |
| 2005/0220599 A1 | 10/2005 | Job et al. | |

(Continued)

FOREIGN PATENT DOCUMENTS

| | | |
|---|---|---|
| CN | 207452808 U | 6/2018 |
| WO | 2017212267 A1 | 12/2017 |

(Continued)

OTHER PUBLICATIONS

John Deere, Why You Should Know About A Skid Steer Adapter For Your Loader, Oct. 21, 2019, https://www.youtube.com/watch?v =KjNMYVpPohs (Last visited Sep. 18, 2025). (Year: 2019).*

(Continued)

*Primary Examiner* — Christopher R Dandridge
(74) *Attorney, Agent, or Firm* — Tucker Ellis LLP

(57) ABSTRACT

A mobile working station is provided. The mobile working stations includes an articulated robotic arm and a platform for supporting the articulated robotic arm. The platform includes a connector for coupling the platform to an agricultural vehicle. The agricultural vehicle directs operation power to the platform via the connector. The platform then directs operational power to the articulated robotic arm.

12 Claims, 8 Drawing Sheets

(56) References Cited

U.S. PATENT DOCUMENTS

| | | | |
|---|---|---|---|
| 2012/0085836 A1* | 4/2012 | Tiu | A01M 9/003 417/234 |
| 2014/0379129 A1 | 12/2014 | Edsinger et al. | |
| 2018/0229373 A1* | 8/2018 | Kullborg | B25J 11/0025 |

FOREIGN PATENT DOCUMENTS

| | | |
|---|---|---|
| WO | WO2019040028 A2 | 2/2019 |
| WO | 2019122927 A1 | 6/2019 |

OTHER PUBLICATIONS

Extended European Search Report and Written Opinion issued in European Patent Application No. 21167867.7, dated Sep. 27, 2021, in 13 pages.

Extended European Search Report and Written Opinion issued in European Patent Application No. 21167867.7, dated Mar. 1, 2022, in 12 pages.

https://www.machinerypete.com/details/loader-and-skid-steer-attachments/2017/mds/2-yd-grapple-bucket/19480318; accessed on Mar. 17, 2021.

MS Foster "Camwash Vehicle Camera Washing System," dated Sep. 2009 (https://msfoster.com/products/cameras-cleaning/camwash/camwash/) (4 pages).

Wikipedia "Fiducial marker," retrieved Nov. 16, 2023 (https://en.wikipedia.org/w/index.php?title=Fiducial_marker&oldid=1184006840) (6 pages).

Ficosa "Sensor and camera cleaning," retrieved Nov. 16, 2023 (https://www.ficosa.com/products/underhood/sensor-and-camera-cleaning/) (4 pages).

Ficosa "Windshield and headlamp washer," retrieved Nov. 16, 2023 (https://www.ficosa.com/products/underhood/windshield-and-headlamp-washer/) (5 pages).

* cited by examiner

MOBILE WORK STATION FOR ROBOTIC ARM

CROSS-REFERENCE TO RELATED APPLICATIONS

This application claims the benefit of and priority to U.S. Provisional Application No. 63/010,795, filed on Apr. 16, 2021. The entirety of this application is herein incorporated by reference.

BACKGROUND

Some agricultural machines may be equipped with a loader. A carrier or base on which the loader is coupled may provide a few degrees of freedom for the loader. Thus, coarse manipulation of objects or material may be performed with the loader. Further, robotic arms may provide additional degrees of freedom compared to the loader. Robotic arms, however, are typically stationary.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a mobile working station is provided. The mobile working station includes an articulated robotic arm and a platform for supporting the articulated robotic arm. The platform and loader include a non-permanent connector for coupling the platform to loader. The loader directs operational power to the platform from agricultural vehicle and the platform directs operational power to the articulated robotic arm from the loader. Operational power may include at least one of electric power, hydraulic power, or pneumatic power. The platform may include a top structure and a bottom structure with vertical supports extending therebetween. A bottom panel may be mounted to the bottom structure and one or more sidewalls may be mounted to at least the vertical supports. The connector is configured to mount to a loader carrier of the agricultural vehicle.

In another embodiment, the non-permanent connector above couples with working components to supporting components. The connector is a modular connector. Working components are readily removable. Thus, hot-swapping components and/or replacing components is an efficient, low-labor process.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
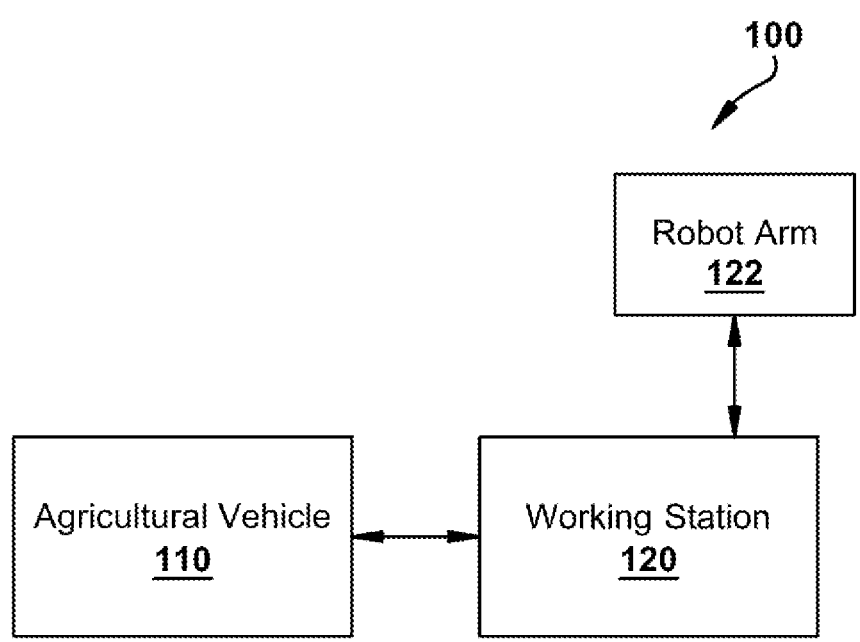
FIG. 1 illustrates a schematic diagram of an exemplary, non-limiting embodiment of a mobile working station system according to various aspects.

As described above, a typical loader attached to an agricultural vehicle provides pushing or transportation of material or objects. Further smaller scale operations on the material or objects is often a manual task. In accordance with various embodiment, a mobile working station is provided to support robotic implements, such as a robotic arm. The mobile working station may couple to an agricultural vehicle in a similar fashion as a loader. Via the connection to the agricultural vehicle through front loader, the mobile working station may receive operational power. Further, the mobile working station may communicatively couple to the agricultural vehicle (via a CAN bus or other communication interface).

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a mobile working station 100 is illustrated. In an embodiment, mobile working station 100 can include an agricultural vehicle 110, such as a tractor for example, having attached thereto a working station or platform 120. The working station 120 may couple to the agricultural vehicle 110 via a carrier employed to mount a loader. The agricultural vehicle 110 provides power to the working station 120. The power may be electric power, or delivered via a fluid (e.g. hydraulically or pneumatically).

The working station 120 may support a robot arm 122. The robot arm 122, in an embodiment, provide additional degrees of freedom beyond the carrier on the agricultural vehicle 110 to which the working station 120 is mounted. For instance, robot arm 122 can articulate to reach, manipulate, and transform objects located in or around the working station 120. Communication with the working station 120 and/or the robot arm 122 can be enabled via the connection to the agricultural vehicle 110. Accordingly, an operator of the vehicle 110 may control the robot arm 122, for example, from within a cabin of the vehicle 110.

Figure 2:
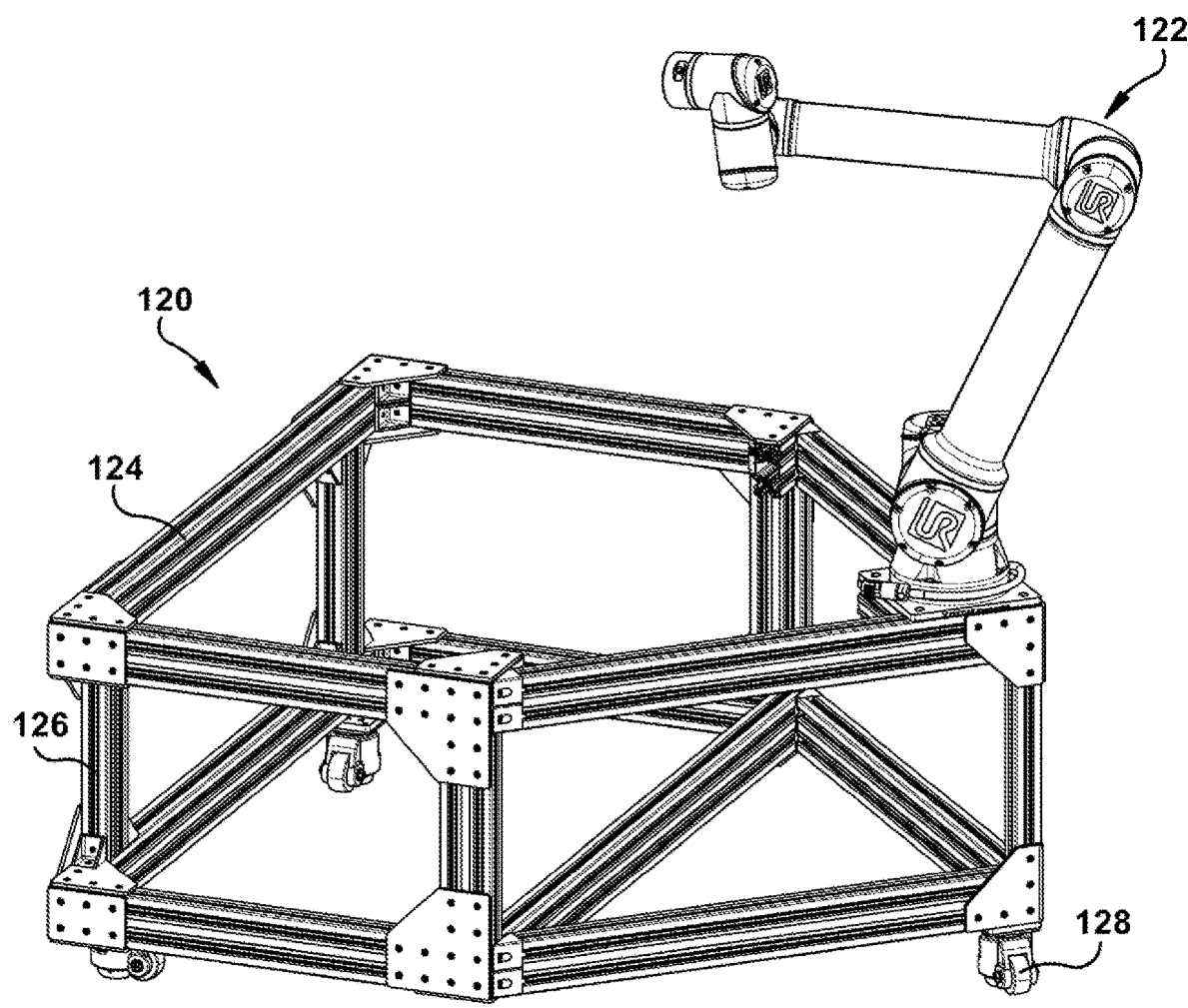
FIG. 2 illustrates an exemplary, non-limiting embodiment of a mobile working station and robot arm in accordance with an aspect.

Turning now to FIG. 2, illustrated is an exemplary embodiment of working station 120. As mentioned previously, the working station 120 supports robot arm 122. Robot arm 122 may be an articulated robotic arm as generally shown in FIG. 2. Further, robot arm 122 may carry a variety of implements, which may be removable or interchangeable to handle a wide range of tasks. For example, robot arm 122 may include a claw-like tool in order to grasp objects, such as plants or produce growing on trees. In accordance with various aspects, objects which may be manipulated by robot arm 122 may include bulk materials, soil, plants, fruits, implements, tools, sensor or instruments (e.g. for direct or indirect measurements of a surrounding environment, plants, *soli*, animals, and/or human beings).

A primary structure of working station 120 may be provided by supports 124 and 126. As described in greater detail below, supports 124 and/or 126 may couple working station 120 to a connector 113. A corresponding connector may be provided on the agricultural vehicle 110 to facilitate coupling of the working station 120 to the agricultural vehicle 110. Specifically, a loader on the agricultural vehicle 110 may include a carrier having the corresponding connector.

In an embodiment, supports 124 are substantially horizontal (e.g. parallel to ground) and define a top structure and a bottom structure. Supports 126 are vertical and extend between the top and bottom structures. Supports 124 further define an overall shape of working station 120, which in the embodiment depicted in FIG. 2, is a pentagon (e.g. home plate shaped). It is to be appreciated that other shapes are contemplated.

Additional support elements 128 may be provided on the bottom structure to support the working station 120 when lowered to a ground level. Support elements 128 may be feet or wheels to enable the working station 120 to be rolled.

Walls or panels may be installed on working station 120. For example, paneling may be mounted onto supports 124 and 126 to provide a bottom surface, sidewalls, and/or a top surface. Station 120, with bottom surface, top surface, and/or sidewalls, provides storage of objects that may be manipulated by robotic arm 122 such as, but not limited to, bulk materials, plants, fruits, implements, tools, etc. The objects may also include sensor or instruments as described above.

Figure 3:
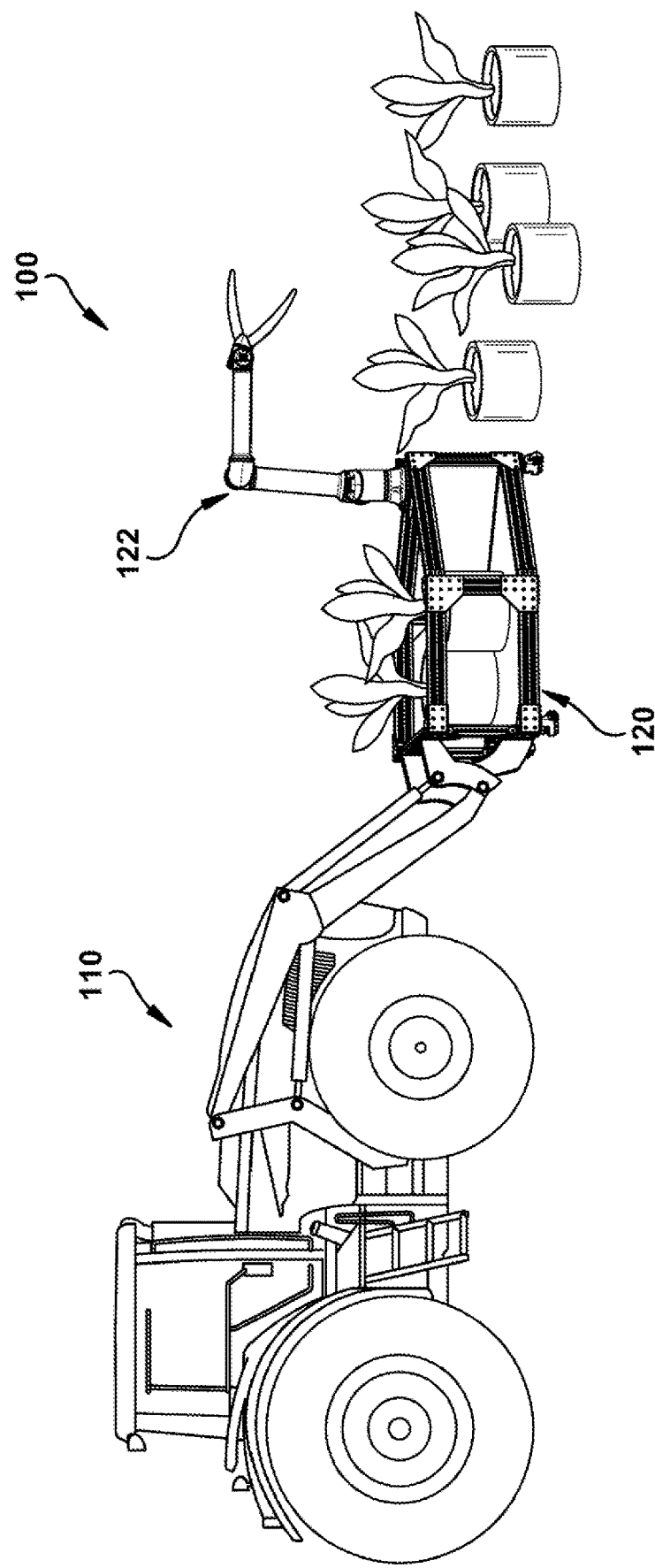
FIG. 3 illustrates an exemplary, non-limiting embodiment of a mobile working station mounted to an agricultural machine according to various aspects.
Figure 4:
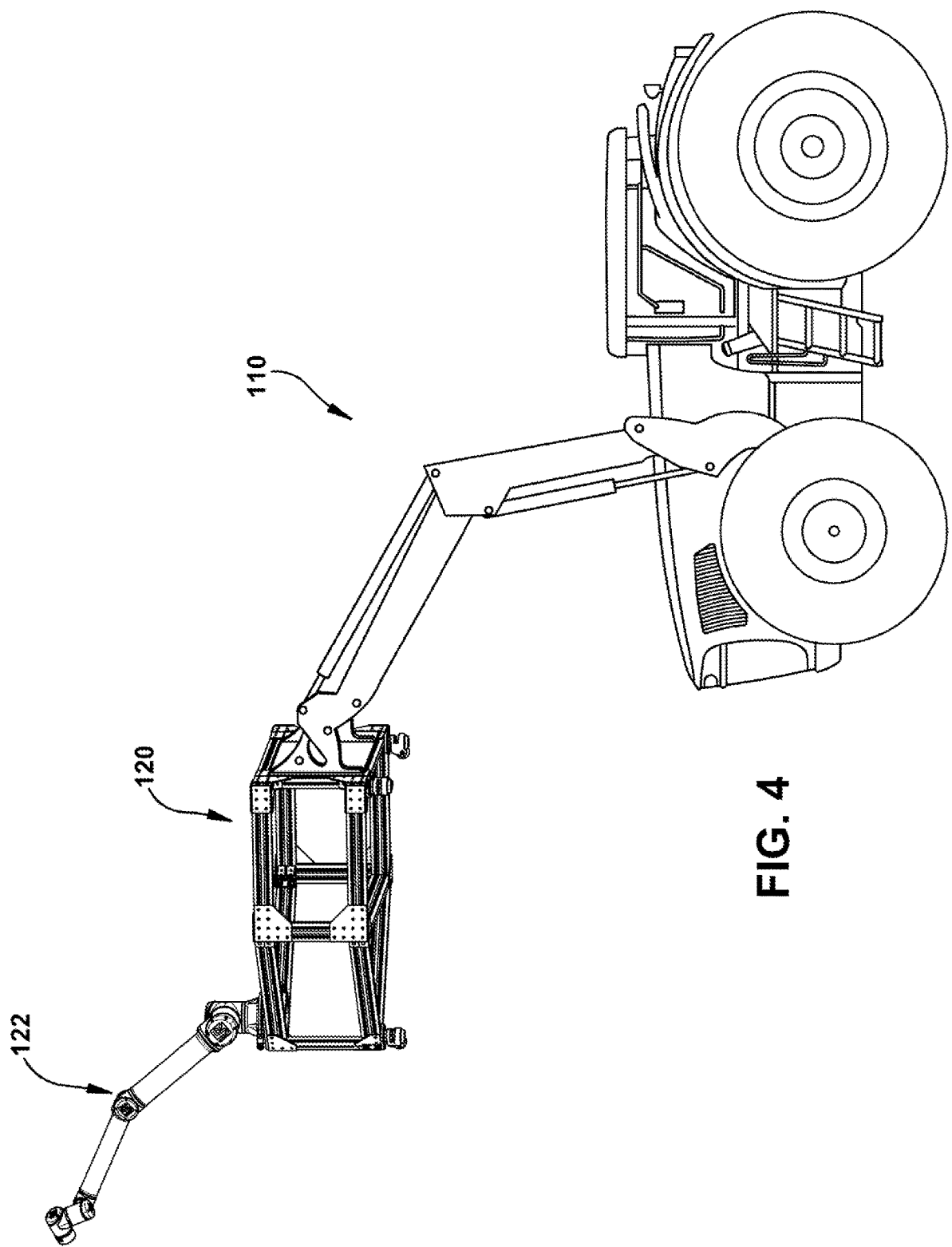
FIG. 4 illustrates an exemplary, non-limiting embodiment of a mobile working station mounted to an agricultural machine according to various aspects.

Referring now to FIGS. 3 and 4, an exemplary mobile working station is depicted. As shown, a working station 120 is coupled to an agricultural vehicle 110. A robot arm 122 is provided on the working station 120 to manipulate objects such as plants as shown in the example of FIGS. 3 and 4.

Figure 5:
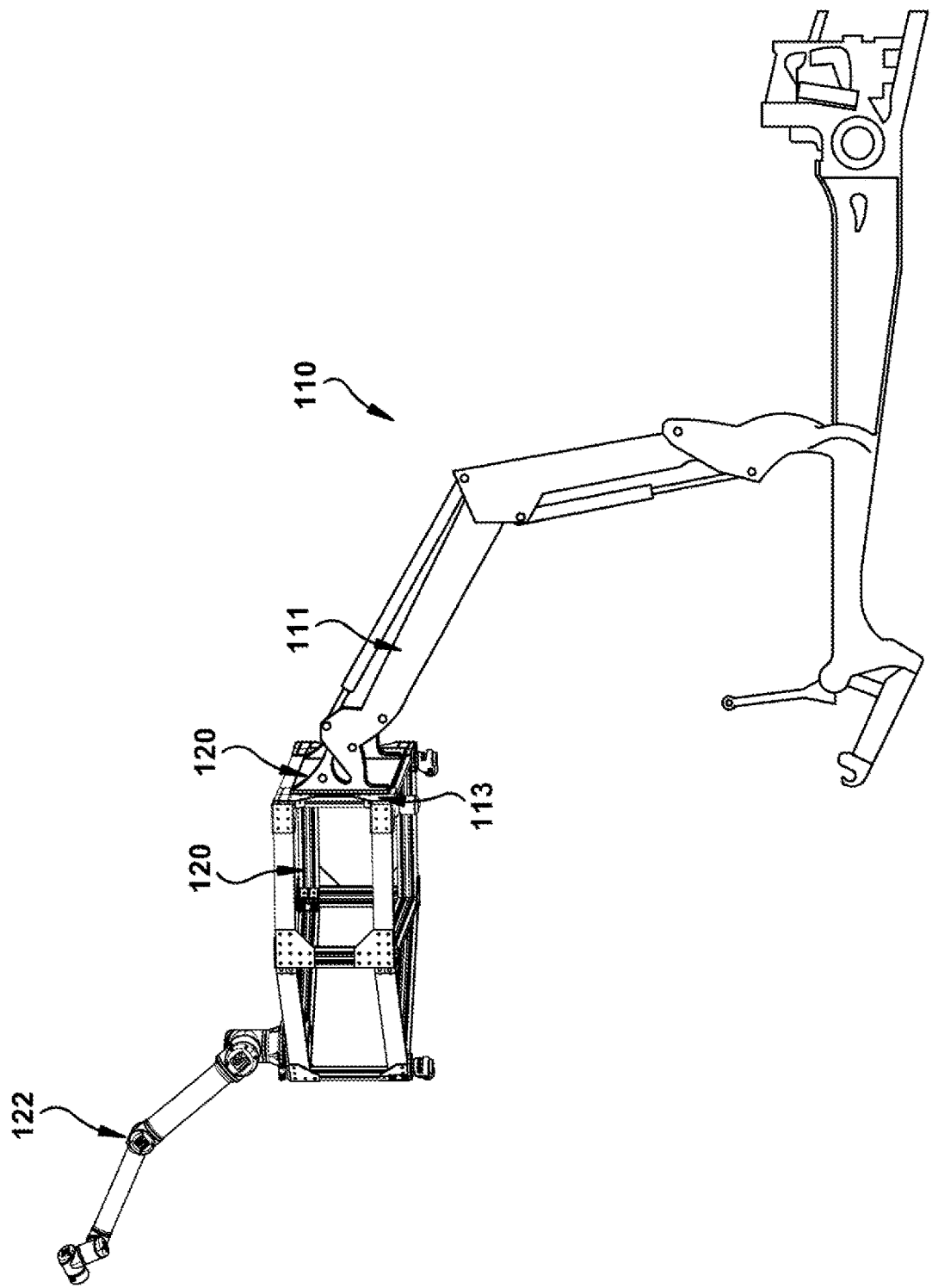
FIG. 5 illustrates an exemplary, non-limiting embodiment of a mobile working station mounted to an agricultural machine via a connector according to various aspects.
Figure 6:
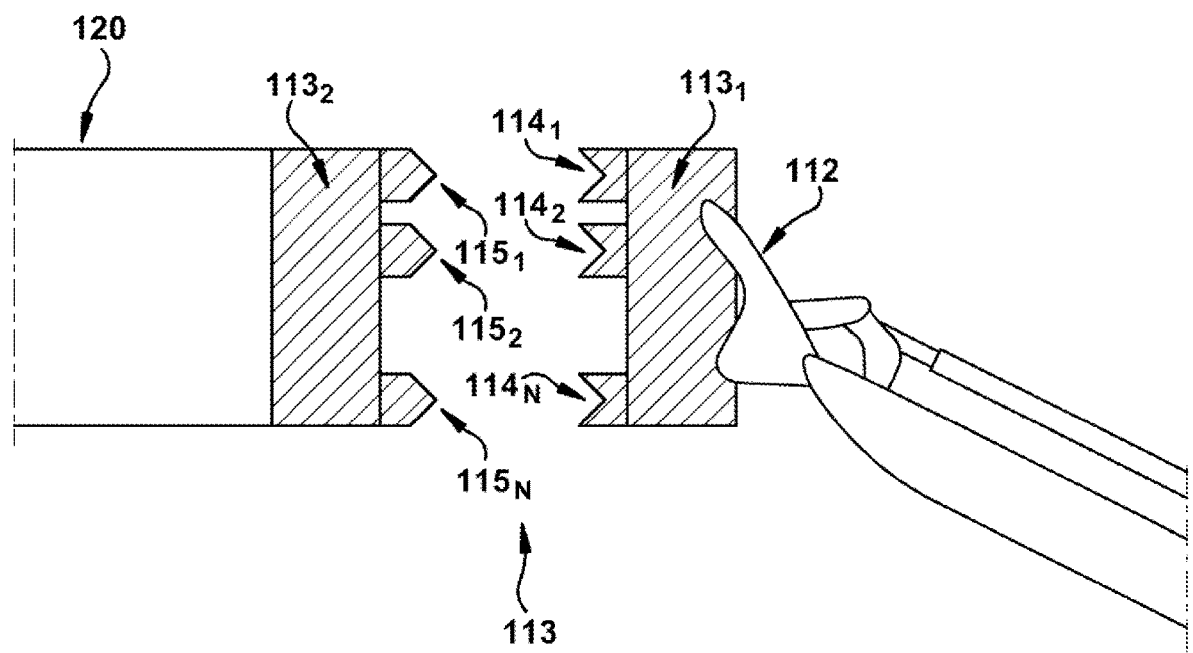
FIG. 6 illustrates an exemplary, non-limiting embodiment of the connector.
Figure 7:
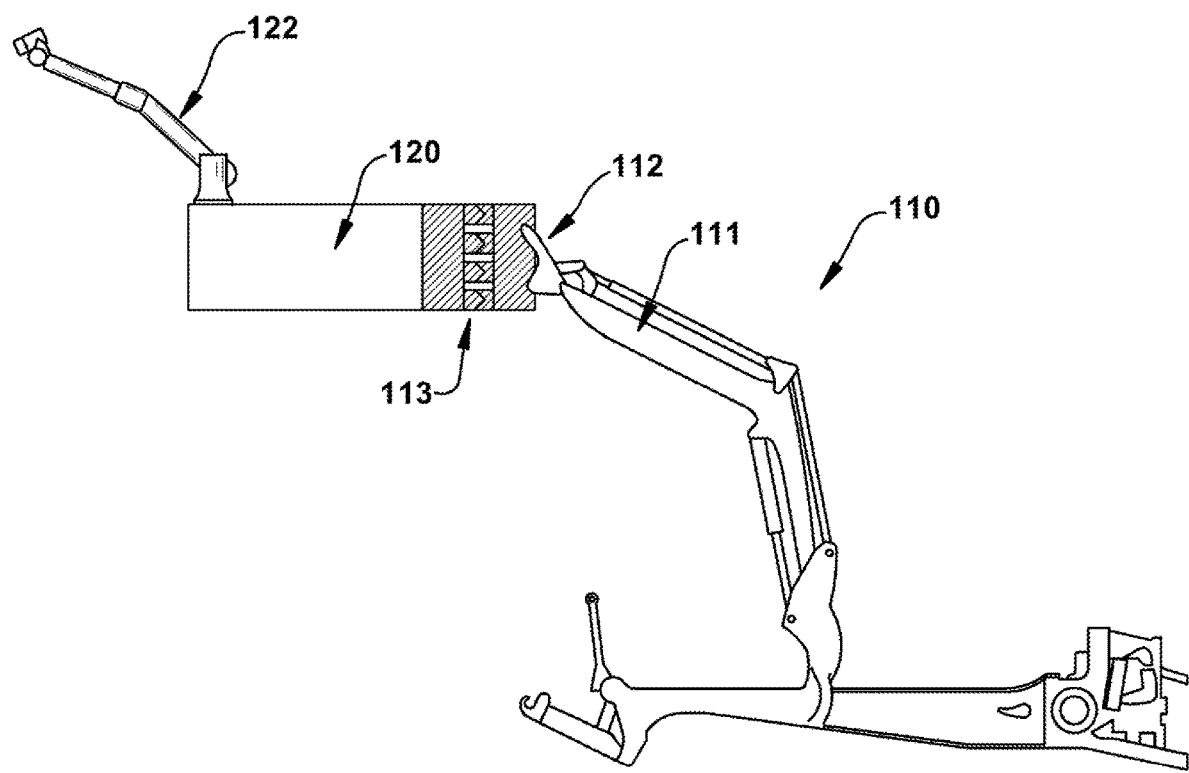
FIG. 7 illustrates an exemplary, non-limiting embodiment of the connector.

Turning to FIG. 5, the agricultural vehicle 110 may include a boom 111 coupled to the agricultural vehicle 110 on one end and having a carrier 112 on an opposing end. The carrier couples to the working station 120 via a connector 113. As shown in FIG. 6, the connector 113 may include a carrier-side (loader-side or vehicle side) connector $113_1$ and a station-side connector $113_2$. The carrier-side and station-side connectors couple together via one or more couplings 114, 115. As shown in FIG. 6, the carrier-side connector $113_1$ includes couplings $114_1$, $114_2$, . . . $114_N$, where N is an integer greater than or equal to one. The station-side connector $113_2$ includes couplings $115_1$, $115_2$, . . . $115_N$. The couplings 114 and 115 are corresponding couplings configured to mate to form a connection as shown in FIG. 7. Once connected, operational power may be provided from the agricultural vehicle 110, through boom 111, to the carrier-side connector $113_1$. Subsequently, power is passed via couplings 114, 115 to station-side connector $113_2$, and onto working station 120. In one example, each coupling 114, 115 may be configured for a particular type of operational power or other purpose. For instance, one pair of couplings $114_1$, $115_1$ may carry electrical power, a second pair of couplings $114_2$, $115_2$ may carry a hydraulic fluid, and a third coupling $114_N$, $115_N$ may provide another fluid (e.g. water or other solution) to the working station 120.

In yet another embodiment, connector 113 may be a mechanical connection. As a mechanical connection, connector 113 limits relative movement between the platform (e.g. working station 120) and carrier 112, when the working station is in operation.

According to a further embodiment, other working components other than the working station 120 may utilize connector 113 to removably and readily couple with a vehicle 110. For example, some vehicles are equipped with headlamps, sensors and/or camera, which are exposed to the environment. As such, these component can accumulate debris that periodically needs cleaned in order for the components to operate properly. A conventional cleansing system may include a nozzle, a hydraulic pump, a compressor (supplying compressed air or pressurized liquid), a heater, and a reservoir. The cleansing system may direct a stream (e.g. which may be at a particular temperature) to an occluded area with one or more nozzles to clean the areas of debris such as dirt, dust, mud, organic materials, snow, ice, etc.

Vehicles that include components requiring cleaning may use the cleansing system described above. That approach, however, involves integrated the cleansing system and all components above into the vehicle, which adds significant development and operational costs.

Figure 8:
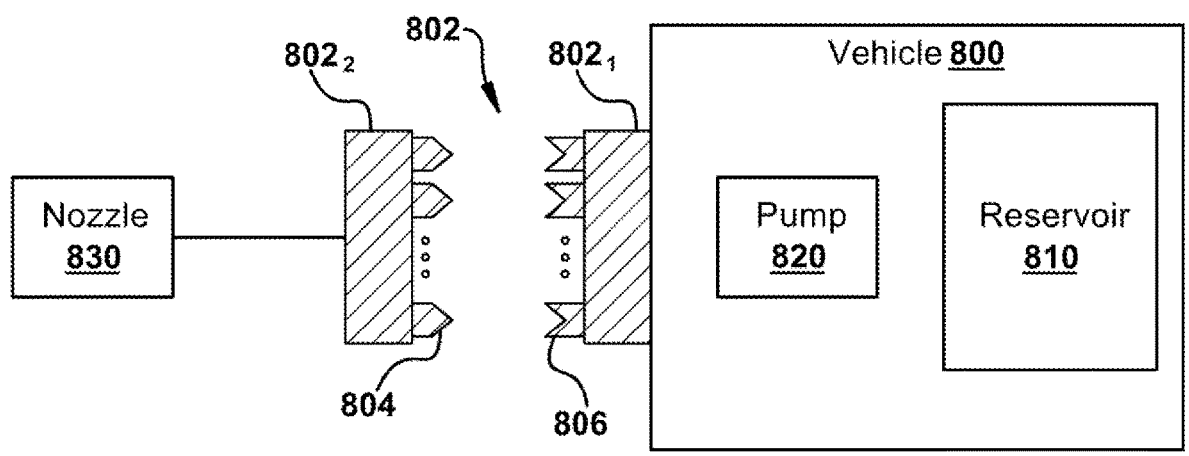
FIG. 8 illustrates a schematic diagram of an exemplary, non-limiting embodiment of implementing a vehicle cleansing system with a connector according to various aspects.

In an embodiment, illustrated in FIG. 8, connector 802 allows integration of a cleansing system to a vehicle 800, for example, in a modular fashion. As shown in FIG. 8, vehicle 800 may include a reservoir 810 containing fluid (e.g. a cleaning solution) and a pump 820 to move fluid from reservoir 820. The pump 820 is coupled with vehicle-side connector $802_1$, which can be removably and readily coupled with a component-side connector $802_2$. In an example, connector 802 may be similar to connector 113 described above. For instance, component-side connector $802_2$ includes one or more couplings 804 and vehicle-side connector $802_1$ includes one or more couplings 805. Couplings 804 and 806 are configured to mate to form a connection through which a fluid and/or electrical power may be delivered from vehicle 800 to a component, such as nozzle 830. Thus, nozzles 830 of various configurations may be coupled to vehicle 800 to perform cleaning functions of different sensors, cameras, fiducial markers or geometric references for vision systems, etc.

In yet another embodiment, nozzle 830 may be incorporated with working station 120 described above. Accordingly, the connector 113 may be similar to connector 802 and provide cleaning fluid to the nozzle.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A mobile working station, comprising:
an articulated robotic arm;
a platform for supporting the articulated robotic arm, the platform being mounted to a loader-carrier of an agricultural vehicle, and wherein the platform further couples to the agricultural vehicle via a connector,
wherein the agricultural vehicle directs operational power to the platform via the connector,
wherein the connector includes one or more protruding mating couplings respectively associated with the agricultural vehicle and the platform, and
wherein the operational power is at least one of electric power, hydraulic power, or pneumatic power.

2. The mobile working station of claim 1, wherein the platform includes a top structure and a bottom structure with vertical supports extending therebetween.

3. The mobile working station of claim 2, wherein a bottom panel is mounted to the bottom structure and one or more sidewalls are mounted to at least the vertical supports.

4. The mobile working station of claim 1, wherein the one or more protruding mating couplings include a vehicle-side coupling and a component-side coupling.

5. The mobile working station of claim 4, wherein the vehicle-side coupling and the component-side coupling being configured to mate to form a connection via which the operational power is directed.

6. The mobile working station of claim 1, wherein each of the one or more protruding mating couplings are configured to provide a resource from the agricultural vehicle to the platform-.

7. The mobile working station of claim 6, wherein the resource is one of electrical power, a hydraulic fluid, or a pneumatic fluid.

8. The mobile working station of claim 1, further comprising a sprayer coupled to the platform.

9. The mobile working station of claim 8, wherein a cleaning solution is delivered from the agricultural vehicle to the spray via the connector.

10. The mobile working station of claim 1, wherein the one or more protruding mating couplings are removably and modularly coupled.

11. The mobile working station of claim 1, wherein the one or more protruding mating couplings includes a first set of couplings associated with the agricultural vehicle and a second set of couplings associated with the platform.

12. The mobile working station of claim 1, wherein each coupling of the first set of couplings mates with a respective coupling of the second set of couplings.

* * * * *